Sept. 18, 1923.

H. J. CHAMPAGNE

INKWELL

Filed March 7, 1921

1,468,067

INVENTOR
H. J. CHAMPAGNE
Joseph J. O'Brien
ATTORNEY

Patented Sept. 18, 1923.

1,468,067

UNITED STATES PATENT OFFICE.

HENRY J. CHAMPAGNE, OF PITTSFIELD, MASSACHUSETTS.

INKWELL.

Application filed March 7, 1921. Serial No. 450,428.

*To all whom it may concern:*

Be it known that HENRY J. CHAMPAGNE, a citizen of the United States of America, residing at Pittsfield, in the county of Hampden and State of Massachusetts, has invented certain new and useful Improvements in Inkwells, of which the following is a specification.

This invention relates to improvements in ink wells, and its leading object is to provide an ink well with means whereby free access can be had to the ink supply by the dipping of the pen in the ink and splashing of the ink will be prevented.

The invention is embodied in a simple construction, including a well of a grate like baffle disposed on the top of the well through which the pen may be dipped to receive its ink supply.

With the above and other objects in view this invention relates to certain new and useful constructions, combinations and arrangements of parts, clearly described in the following specification and fully illustrated in the accompanying drawings, in which.

Figure 1:
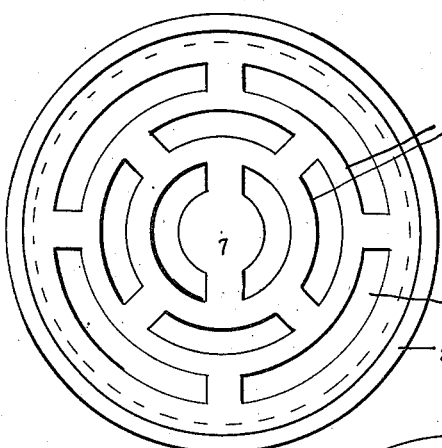
Figure 1 is a plan view showing the cover removed.
Figure 2:
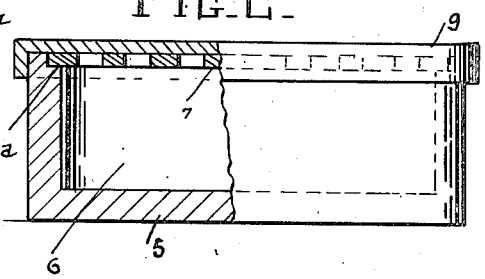
Figure 2 is a side elevation partly in section showing the cover in position.

Referring to the accompanying drawings 5 designates a container having a supply chamber or well 6 and a shoulder $6^a$ on which the grate like baffle 7 is disposed.

The baffle 7 is shown to be provided with a series of arcuate slots 8 arranged in staggered relation to each other and through which the pen point may be extended to receive ink contained in the well 6. The pen receiving openings 8 are relatively narrow so as to provide baffle portions $8^a$ therebetween, which serve to prevent the ink from splashing upwardly when the pen in extended through the openings. These portions $8^a$ also provide numerous scraping edges or wiping surfaces whereby the pen point may be cleaned as desired. A removable cover 9 may be positioned over the ink well for excluding dust and preventing evaporation.

Figure 3:
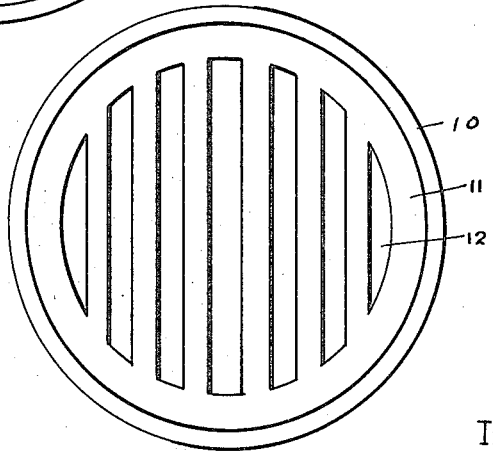
Figure 3 is a plan view with the cover removed, of a modified form.

In Figure 3 I show a modified form of the invention wherein the well 10 is provided with a grate like baffle 11 having parallel straight openings 12 formed therein.

Having described my invention, I claim:

1. An ink well provided with a grate like baffle cover providing a series of relatively narrow pen receiving openings and splash preventing portions between the openings.

2. An ink well provided with a covering member having a series of slots therein through which the pen may be extended, said openings being relatively narrow and providing splash preventing portions, and wiping edges.

3. An ink well comprising a body having a shoulder thereon, and a baffle member located on the shoulder and provided with a series of arcuate slots spaced from each other to form splash preventing portions.

4. An ink well comprising a body and a baffle member seated thereon to cover the chamber of the well, said baffle member being formed with a series of slots extending therethrough to provide relatively narrow splash preventing portions, the baffle member being relatively thin, and the ink well being relatively shallow, said slots providing openings for insertion of a writing pen therein.

Signed by me at Pittsfield, Mass.

HENRY J. CHAMPAGNE.